US012612898B2

(12) United States Patent
Putrams

(10) Patent No.: US 12,612,898 B2
(45) Date of Patent: Apr. 28, 2026

(54) COMPUTER NUMERICAL CONTROL MACHINE ANCHORING SYSTEMS AND METHODS FOR WIND TURBINE BLADE MAINTENANCE AND REPAIR

(71) Applicant: Aerones Inc., San Jose, CA (US)

(72) Inventor: Janis Putrams, Riga (LV)

( * ) Notice: Subject to any disclaimer, the term of this patent is extended or adjusted under 35 U.S.C. 154(b) by 0 days.

(21) Appl. No.: 19/270,532

(22) Filed: Jul. 16, 2025

(65) Prior Publication Data

US 2025/0341205 A1 Nov. 6, 2025

Related U.S. Application Data

(62) Division of application No. 18/615,174, filed on Mar. 25, 2024, now Pat. No. 12,392,326.

(60) Provisional application No. 63/555,457, filed on Feb. 20, 2024.

(51) Int. Cl.
F03D 80/50 (2016.01)

(52) U.S. Cl.
CPC ........ F03D 80/502 (2023.08); *F05B 2230/80* (2013.01)

(58) Field of Classification Search
CPC ...... F03D 80/50; F03D 80/501; F03D 80/502; F03D 80/504; F03D 80/505; F03D 80/509; F03D 80/40; F03D 80/55; F05B 2230/80
See application file for complete search history.

(56) References Cited

U.S. PATENT DOCUMENTS

| | | | |
|---|---|---|---|
| 2012/0103705 A1* | 5/2012 | Schlee | B25J 5/007 180/14.1 |
| 2020/0019164 A1* | 1/2020 | Li | B25J 9/1666 |
| 2021/0095642 A1* | 4/2021 | Cieslak | B62D 57/024 |

FOREIGN PATENT DOCUMENTS

| | | | | |
|---|---|---|---|---|
| WO | WO-2021121522 A1 * | 6/2021 | | F03D 80/50 |

* cited by examiner

*Primary Examiner* — Aaron R Eastman
(74) *Attorney, Agent, or Firm* — Inventions International Inc.; Tiffany C. Miller

(57) ABSTRACT

A system and method is disclosed for anchoring a computer numerical control (CNC) machine to a wind turbine blade. The method includes disposing one or more fasteners of the CNC machine at a surface of the wind turbine blade and implementing one or more tools of the CNC machine at a portion of the wind turbine blade. This method enables efficient and precise machining operations to be performed directly on the wind turbine blade, facilitating maintenance and repair tasks while minimizing downtime and reducing costs associated with blade removal and transportation. The anchoring of the CNC machine ensures stability and accuracy during the machining process, resulting in improved blade performance and extended operational lifespan of the wind turbine.

17 Claims, 7 Drawing Sheets

COMPUTER NUMERICAL CONTROL MACHINE ANCHORING SYSTEMS AND METHODS FOR WIND TURBINE BLADE MAINTENANCE AND REPAIR

PRIORITY CLAIM

This application is a United States Divisional Non-Provisional Utility Application having priority to U.S. Non-Provisional application Ser. No. 18/615,174, Filed Mar. 25, 2024, which issued as U.S. Pat. No. 12,392,326 on Aug. 19, 2025, which claims priority to U.S. Provisional Application Ser. No. 63/555,457, filed Feb. 20, 2024 entitled COMPUTER NUMERICAL CONTROL MACHINE ANCHORING SYSTEMS AND METHODS FOR WIND TURBINE BLADE MAINTENANCE AND REPAIR, the entirety of which is hereby incorporated by reference as if fully set forth herein.

BACKGROUND

Wind energy extraction predominantly employs wind turbines, yet the blades of the wind turbines are susceptible to various forms of damage, such as leading-edge erosion and crack formation, triggered by factors including lightning strikes, severe environmental conditions such as temperature fluctuations, exposure to salt, and/or ice formation, infestation by insects, dust, algae, among others. Consequently, regular inspection, repair, and maintenance are needed for wind turbine functionality. Conventional methods for wind turbine inspection often necessitate halting turbine operations to conduct visual checks and measurements. However, this interruption decreases turbine uptime, thereby escalating inspection costs. Moreover, the heightened expenses incentivize reducing inspection frequency, potentially compromising maintenance costs and the operational lifespan of wind turbines.

Maintenance procedures for land-based wind turbines sometimes involve manual approaches. For example, workers may access turbine blades via ropes, which, despite being expensive and time-consuming, pose seasonal limitations, are weather-dependent, and/or may carry inherent dangers. Alternatively, semi-automated maintenance techniques deploy equipment from the ground, positioning it over turbine blades using winch and pulley systems. These maintenance systems typically require up to four ground anchor points for proper stabilization around the turbine base. Turbine wings, being large and expensive to maintain, mandate at least two personnel for repair tasks, a process fraught with financial and safety risks. Typically, maintenance work may only occur during ideal weather conditions. For example, maintenance work may be limited to approximately 15 days a year, posing challenges to scheduling maintenance activities.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 6 is a sectional view of a wind turbine blade with surface indicia implemented in the systems and methods of FIGS. 1-5 according to some embodiments of the present disclosure according to some embodiments of the present disclosure.

DETAILED DESCRIPTION

FIGS. 1-7 illustrate example CNC machine anchoring systems and methods for wind turbine blade maintenance and repair that may address many challenges confronting wind turbine robotics to achieve accuracy and precision amidst ever-changing weather conditions. While refining the wing's external surface represents a relatively simpler task and currently constitutes established practice, the precision demanded for repairing and reconstructing wing components within the turbine's environment is needed to avoid inadvertent damage. This includes conducting operations during rainy conditions without compromising the wing's integrity due to water ingress. The overarching objective is to conduct repair and maintenance activities beyond optimal conditions, thus diminishing reliance on human intervention and establishing a precise, accurate system for robotic drones to undertake all necessary tasks.

Figure 1:
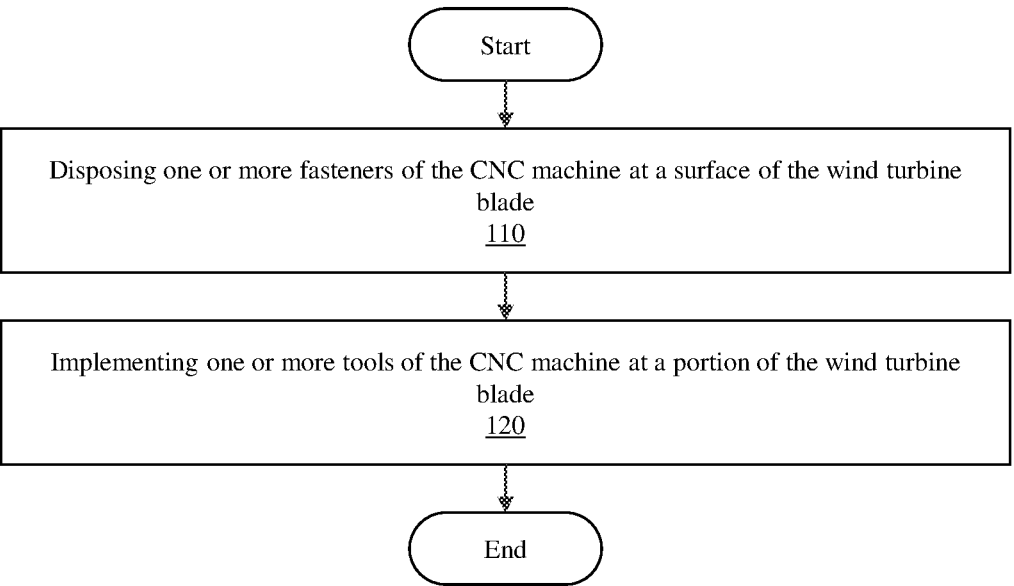
FIG. 1 is a flowchart illustrating a method for anchoring a computer numerical control (CNC) machine, according to some embodiments of the present disclosure.

FIG. 1 is a flowchart that describes an example method for anchoring a CNC machine of a CNC machine anchoring systems to a wind turbine blade, according to some embodiments of the present disclosure. In some embodiments, at 110, the method may include disposing one or more fasteners of the CNC machine at a surface of the wind turbine blade. At 120, the method may include implementing one or more tools of the CNC machine at a portion of the wind turbine blade. In some embodiments, the one or more fasteners of the CNC machine may be connected to a first end of an extendable rod, the one or more tools of the CNC machine may be connected to a second end of the extendable rod.

In some embodiments, the method may include extending or retracting the extendable rod, using an actuator configured to partially traverse the one or more tools of the CNC machine along a portion of the wind turbine blade. In some embodiments, the one or more fasteners and/or one or more tools of the CNC machine may be removable. In some embodiments, at least a portion of the CNC machine may be connected to an unmanned aerial vehicle (UAV).

In some embodiments, the disposing may include implementing image processing technology to align the CNC machine at a surface indicia at a predetermined location at the wind turbine blade. Typically, surface indicia may include a marking and/or an indicator placed on the surface of the blade. These markers may be digitally marked, physically marked, and/or suction. The process involves disposing one or more fasteners of the CNC machine at these surface indicia. The term "fasteners" typically refers to mechanical devices like screws or bolts used to secure or fasten components. In practical terms, the CNC machine is aligned by placing its fasteners precisely at the designated surface indicia on the wind turbine blade. This alignment ensures that the machining or other operations performed by the CNC machine are accurately positioned on the blade surface. In some embodiments, the one or more fasteners of the CNC machine may be connected to a first end of one or more rods, the one or more tools of the CNC machine may be connected to a second end of the one or more rods. In some embodiments, the method may include hingedly pivoting the one or more rods to partially traverse the one or more tools of the CNC machine along a portion of the wind turbine blade. In some embodiments, the method may include analyzing, using one or more sensor of the CNC machine, at least a portion of the wind turbine blade. In some embodiments, the one or more sensors may be capable of transmitting and receiving ultrasonic waves. In some embodiments, the one or more sensors may include a humidity sensor.

Figure 2:
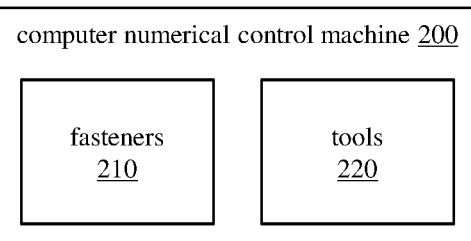
FIG. 2 is a block diagram illustrating a CNC machine, according to some embodiments of the present disclosure.

FIG. 2 is a block diagram that describes the CNC machine 200 implementing the method of FIG. 1, according to some embodiments of the present disclosure. In some embodiments, the CNC machine 200 may include one or more fasteners 210 of the CNC machine disposed at a surface of the wind turbine blade and one or more tools 220 of the CNC machine implemented at a portion of the wind turbine blade. In some embodiments, the one or more fasteners 210 of the CNC machine may be connected to a first end of an extendable rod, the one or more tools 220 of the CNC machine may be connected to a second end of the extendable rod.

In some embodiments, the CNC machine anchoring system may also include an actuator to extend or retract the extendable rod, the extendable rod configured to partially traverse the one or more tools 220 of the CNC machine along a portion of the wind turbine blade. In some embodiments, the one or more fasteners 210 of the CNC machine may be connected to a first end of one or more rods, the one or more tools 220 of the CNC machine may be connected to a second end of the one or more rods.

In some embodiments, the one or more rods are configured to partially traverse the one or more tools 220 of the CNC machine along a portion of the wind turbine blade. In some embodiments, the one or more fasteners 210 of the CNC machine may be removable. At least a portion of the CNC machine may be connected to a UAV. In some embodiments, image processing technology may align the CNC machine at a surface indicia of a predetermined location at the wind turbine blade. The surface indicia may serve as a reference point, and the image processing technology helps in precisely identifying and aligning the CNC machine with this surface indicia. This alignment is may be utilized for accurate and controlled machining processes on the wind turbine blade. The integration of a surface indicia and image processing technology may enhance the precision and efficiency of CNC operations, ensuring that the machining is carried out at the intended location on the blade for optimal results in the maintenance or manufacturing process. In some embodiments, the CNC machine anchoring system may include one or more sensor of the CNC machine to analyze at least a portion of the wind turbine blade. In some embodiments, the one or more sensors may be capable of transmitting and receiving ultrasonic waves.

The CNC machine anchoring systems and methods for wind turbine blade maintenance and repair encompasses a multifaceted robotic maintenance and repair setup equipped with diverse interchangeable toolsets capable of servicing and rectifying wind turbine wing components in diverse weather conditions. The efficiency of this system heavily relies on establishing a secure, traceable, and precise anchoring structure. Numerous challenges are associated with implementing this system, such as addressing diverse weather conditions and an unstable operational setting encompassing rain, wind, lightning, and turbine movements. Ensuring stability issues that impact the robot's location and orientation concerning the repair or maintenance area is another substantial challenge. The system may enable comprehensive traversal of the entire wing, facilitate vertical movement along the turbine, and ensure precise and accurate anchoring at the maintenance or repair site. The system's adaptability to multiple returns to the anchoring site with different robots, underlining the accurate anchoring, is needed to address the identification, repair, and discernment of multiple layers constituting the wing structure, encompassing depth determination for cutting, and necessary repairs.

Certain limitations are apparent, including constraints associated with utilizing large, high-precision equipment such as the CNC machines, which are typically impractical within wind turbine settings. CNC machines may include, but not be limited to, automated tools that operate using computer programming to control their manufacturing processes. These machines employ computerized systems to control and execute various tasks using one or more tools including, but not limited to, sanding, grinding, filling, adhering, painting, cutting, milling, drilling, or shaping the blades of a wind turbine based on digital designs and instructions. The CNC machines may interpret numeric data to guide the cutting tools and movements, ensuring precision and accuracy in manufacturing components. However, due to their large size and complexity, integrating CNC machines for repair and maintenance tasks within the confined and dynamic environment of a wind turbine may be impractical and challenging. The limitations associated with using CNC machines in this context include their size, adaptability to the turbine's structure, and the dynamic nature of repair operations, making their utilization less feasible in wind turbine settings. The precision required for repair tasks involving cutting, sanding, and plugging openings due to the dynamic movements executed by the robot is a pivotal aspect outlined in subsequent disclosures. An effective robotic solution may include operation in any weather condition, maintaining positional accuracy during or after tool exchanges, supporting curved shapes without right angles when accessing damaged areas within the wing, and integrating offline CNC machines for producing precise three-dimensional (3D) shapes for damaged wing sections' replacement. The primary aim is to develop a solution that caters to robotics in adverse weather conditions while simultaneously establishing a self-anchoring system for precise repair and maintenance operations.

A linear actuator is typically an electric motor-based device that converts rotary motion into linear motion, extending and retracting a rod or shaft along its axis. On the other hand, a hydraulic actuator operates using fluid power, typically oil or another hydraulic fluid, to create linear motion by converting hydraulic pressure into mechanical force. These two types of actuators may be integrated into the system to create an extendable rod mechanism where the linear actuator controls the primary extension and retraction movement, while the hydraulic actuator might provide additional force, precision, or support depending on the specific design and requirements of the application.

When considering the connection of a CNC machine to a wind turbine blade, several types of removable fasteners may be employed for secure and temporary attachment. One option involves specialized clamping mechanisms designed with adjustability and non-abrasive surfaces to securely grip the blade without causing deformation or damage. Another viable approach utilizes vacuum suction cups equipped with high-powered suction capabilities, creating a strong temporary hold via vacuum pressure on the blade surface. Magnetic mounts represent an alternative solution, relying on powerful magnets to adhere securely to the metal components of the blade, allowing for straightforward detachment when necessary. Additionally, custom fixtures and/or clamping systems engineered to match the unique geometry and structure of the wind turbine blade may be used, ensuring precise attachment points for stability and accuracy during CNC operations. Temporary adhesives and/or or fasteners may be designed for robustness during machining while enabling damage-free removal offer another potential option. The selection of an appropriate removable fastener hinges on various factors such as blade material, surface conditions, CNC machine requirements, and the forces involved during the machining process. Additionally, load-bearing capacity, compatibility with the blade material, and the ability to be removed without causing damage are crucial considerations when determining the most suitable fastening method for connecting the CNC machine to the wind turbine blade.

The integration of a CNC machine with an aerial vehicle entails a complex engineering feat involving the adaptation of machining technology onto an airborne platform. This setup typically involves a smaller, portable CNC system integrated or mounted onto an aerial vehicle, such as a drone or an UAV. The CNC machine is modified to accommodate the weight, size, and operational requirements suitable for airborne applications. This aerial CNC system might include a miniaturized machining unit equipped with cutting, milling, or other machining tools, controlled by computerized systems. The aerial vehicle, usually a drone or UAV, provides the mobility and maneuverability necessary for the CNC machine to access remote or difficult-to-reach locations. The vehicle's flight capabilities enable it to transport the CNC equipment to specific sites, allowing precision machining or fabrication tasks to be performed in otherwise inaccessible or challenging environments. The CNC machine's setup on the aerial vehicle requires careful engineering considerations to ensure stability, balance, and structural integrity during flight. Furthermore, the system design may account for factors such as power supply, weight distribution, vibration control, and safety measures to ensure the CNC machine operates effectively while the aerial vehicle is in motion.

In some embodiment, the UAV may execute wing damage assessment and maintenance operations. Maintenance activities may encompass a broad spectrum, including but not restricted to inspection, cleaning of drainage apertures, application of ice-phobic or general coatings, undertaking non-destructive testing (NDT), performing checks on the lightning protection system, and more. Various types of damage may be identified, including but not limited to coating cracks, edge erosion, skin-core debonding, among other potential issues.

As noted, in at least one embodiment, surface 3D scanning by one or more components of the CHC machine may include various methods for capturing 3D data. LASER triangulation 3D scanning relies on laser beams to measure distances and create a detailed representation. Structured light 3D scanning employs projected patterns of light to capture surface geometry accurately. Photogrammetry involves analyzing multiple images to reconstruct the 3D structure. Contact-based 3D scanning utilizes physical probes or touch to gather surface data. LASER pulse-based 3D scanning relies on laser pulses to measure distances and create a comprehensive 3D model. Each method offers unique advantages based on specific requirements and applications in the field of 3D scanning technology.

Further, in implementations light detection and ranging (LiDAR) may be implemented by the CNC machine. LiDAR is a remote sensing technology that utilizes laser pulses to measure distances to objects or surfaces by illuminating the target and analyzing the time it takes for the reflected laser light to return to the sensor. Similar to radar but using laser light instead of radio waves, LiDAR systems emit laser beams toward a target and then measure the time it takes for the light to bounce back. By precisely timing the return of these light pulses, LiDAR systems may generate highly accurate 3D maps or point clouds of the target's surface, providing detailed information about the object's shape, distance, and sometimes even material composition.

A combination of a UAV equipped with LiDAR (Laser Detection and Ranging) technology and a CNC machine may potentially facilitate the connection process between the CNC machine and a wind turbine blade in a highly technical manner. LiDAR technology integrated into the UAV enables 3D scanning and/or mapping of the wind turbine blade's surface. The UAV equipped with LiDAR sensors may emit laser pulses towards the blade's surface, detecting the reflection and time-of-flight data of the laser beams. By analyzing the return signals, LiDAR generates a detailed and accurate 3D point cloud or digital representation of the blade's geometry, contours, and surface irregularities. The CNC machine, designed to be mobile and adaptable, may then be guided by the data obtained from the LiDAR scan. Utilizing this information, the CNC system calculates the optimal attachment points and coordinates for secure connection to the wind turbine blade. During the connection process, the CNC machine is deployed by the UAV to the designated attachment points on the blade's surface. The CNC's positioning and attachment mechanisms are controlled and adjusted based on the precise spatial information obtained from the LiDAR scan, ensuring accurate alignment and secure fastening of the CNC equipment to the blade. This advanced integration of LiDAR technology with the UAV and CNC system streamlines the process of connecting the CNC machine to the wind turbine blade by providing detailed spatial data, enhancing precision, and enabling efficient and secure attachment of the machining equipment for repair or maintenance tasks. In the context of wind turbine maintenance or inspection, LiDAR sensors mounted on UAVs or drones may be used to create detailed 3D scans of turbine blades, enabling precise assessment, inspection, and maintenance planning without direct physical contact.

During repair or maintenance procedures of the wind turbine blade, alignment of the robotic system to the accurate position and orientation is needed. This places a demand on the system's capability to anchor the robot with absolute accuracy while ensuring continuous identification of the anchoring sites throughout the operation. Each device deployed must consistently maintain identical coordinates for proper anchoring and subsequent maintenance or repair activities. In many scenarios, diverse tools might be necessary, necessitating the deployment of multiple robots for a single repair task. Tasks may also entail the utilization of separate ground machinery, such as CNC machines, or entail multiple trips by the same robot. For instance, certain maintenance or repair operations might require the robot to ascend and descend the turbine multiple times, or different robots might be indispensable at various stages. In an example, one robot could be designated for blade analysis including, but not limited to, conducting ultrasound tests and/or humidity assessments, while another robot is designated for the actual repair tasks, such as painting, sanding, or perforating holes. This circumstance poses a challenge or necessitates the system to ensure the preservation of the anchor position continuity between different steps or transitions amid various robots.

In an embodiment, typically a humidity sensor is commonly known for measuring the humidity of the air. However, some humidity sensors may be configured to measure humidity within the blade of a wind turbine. These sensors may be placed within the system to assess and monitor the moisture levels within the turbine's components, providing data for optimizing performance and ensuring the longevity of the equipment. This application of humidity sensors in wind turbines contributes to efficient operation and maintenance practices in the renewable energy sector. Examples of humidity sensors configured for measuring humidity within the blade of a wind turbine may include advanced capacitive humidity sensors and/or thin-film capacitive humidity sensors. These sensors are designed to withstand the environmental conditions within the turbine blade. Additionally, one or more humidity sensors may be integrated into the CNC machine anchoring system and/or may be electronically coupled to the CNC machine and configured for the unique challenges of wind turbine applications. These specialized sensors may contribute to accurate and reliable measurements, allowing for precise monitoring and control of humidity levels within the turbine components for optimal performance and maintenance.

When a robot identifies maintenance or repair requirements, it's essential that the robot also determines the appropriate anchor points based on the nature of the necessary work. These anchor points may be categorized as fixed or unfixed, each employing distinct methods for attachment. Fixed anchor types encompass various methods such as adhesive bonding, suction cups, drilling, or utilizing stainless steel bar systems. These fixed anchors are securely positioned throughout the duration of the maintenance or repair tasks. Any robot may utilize these fixed anchor types, ensuring consistent identification and stable orientation, and allowing for subsequent removal or patching upon task completion. In contrast, an unfixed visual anchoring system relies on advanced image processing technologies like LiDAR, ultrasound, high-resolution image processing, or radio technologies to ascertain the precise anchor position. This unfixed system identifies anchor points based on specific features like drilled holes, repaired areas, or recognizable visual markers on the turbine or blade. However, it lacks the capability to incorporate physical barriers such as stainless steel rods or canopies, thus making it susceptible to weather-related limitations like potential rain damage. In further exploration, a potential solution involves utilizing hot glue and hook points to address dents. Suction cups, although effective to a certain extent, might be limited by atmospheric conditions. Alternatively, employing adhesive bonding to the blade, possibly with temporary adhesives post-paint removal, could provide secure anchoring and load support. The use of glued anchor points offers advantages such as resilience against weather-related issues or power loss, ensuring precise anchor point retention, and facilitating the robot's easy return to the designated location.

Various types of maintenance or repairs may be necessary for a turbine wing, with the subsequent process applicable to differing repair scenarios. For instance, a turbine wing requiring procedures like sanding, cutting existing material, painting, etc., exemplifies a typical repair process. These steps are adaptable to diverse maintenance scenarios. The sequence involving a robot repairing a wing begins with an analysis robot ascending the turbine towards the problematic wing. Conducting blade analysis (e.g., ultrasound testing, humidity assessment), this robot identifies issues and repairs needed. Upon issue identification, either the analysis robot or the subsequent robot required for initial repair stages utilizes fixed or unfixed anchoring methods mentioned earlier to anchor itself. Subsequently anchored, the robot commences the sanding/grinding process on the wing, potentially involving the removal of multiple layers. Post-sanding/grinding completion, the robot delineates the area earmarked for replacement, often demarcated by surface indicia such as, a colored marking.

Next, the robot completely removes the designated area, leaving an opening to be filled. Measurements of this space are taken using diverse techniques (e.g., basic measurement, LiDAR/radar), and the information is conveyed to the ground CNC machine. Returning to the wing, either the same or another robot applies adhesive for plug adhesion. Once adhesive application concludes, the robot places plugs in the cut-out portions. Subsequently, the robot sands the surface, achieves material leveling, wipes it clean, and applies a mesh layer for subsequent sanding, refinishing, and painting iterations. The robot or a series of robots engaged at different stages undertake scaling, refinishing, and painting of the plug and the adjacent areas, layer by layer, in a meticulous and time-consuming process, ultimately yielding a seamless and fully sealed repair. The anchoring system's precision and stability enable the utilization of multiple robots at various repair stages in a well-coordinated manner. A static anchor, such as drilled holes, serves as a reference point for realignment during repair procedures. Several solutions aid the drone in reorientation, including visual matching through images, utilizing imaging for distance and dimensional measurements, positioning relative to tools or initial cuts, and employing lasers or combinations of lasers and cameras. The CNC machine 200 of FIG. 2 may be implemented in a CNC machine anchoring system as shown in FIGS. 3 and 4 to employ a force, wherein the robot, typically referred to as the CNC machine 200, physically touches the wind turbine blade and registers the contact as a means of positioning and orientation.

Figure 3:
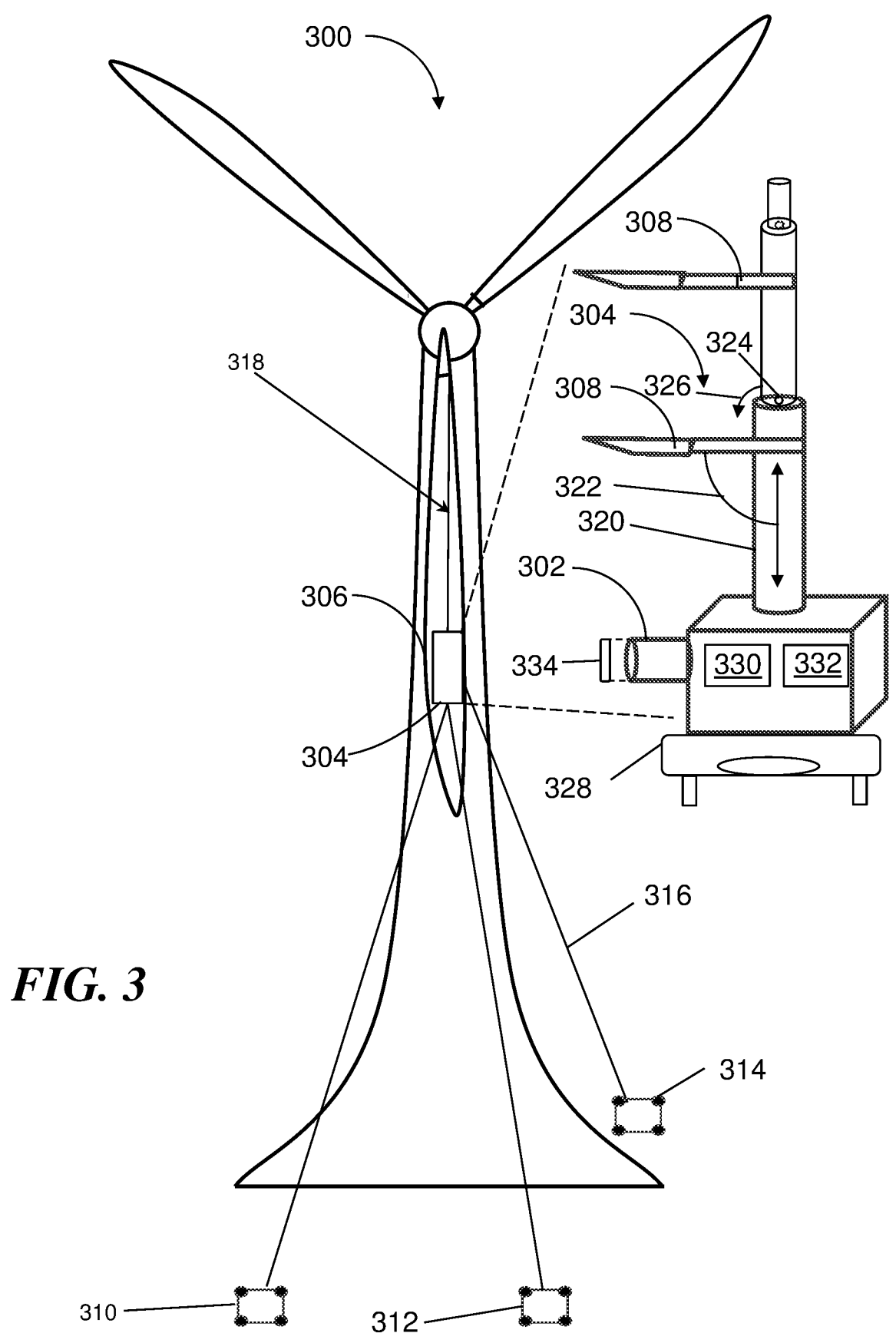
FIGS. 3 and 4 is a perspective view of an anchoring system employing one or more fasteners to connect a computer numerical control (CNC) machine to at least a portion of a wind turbine blade according to some embodiments of the present disclosure.
Figure 4:
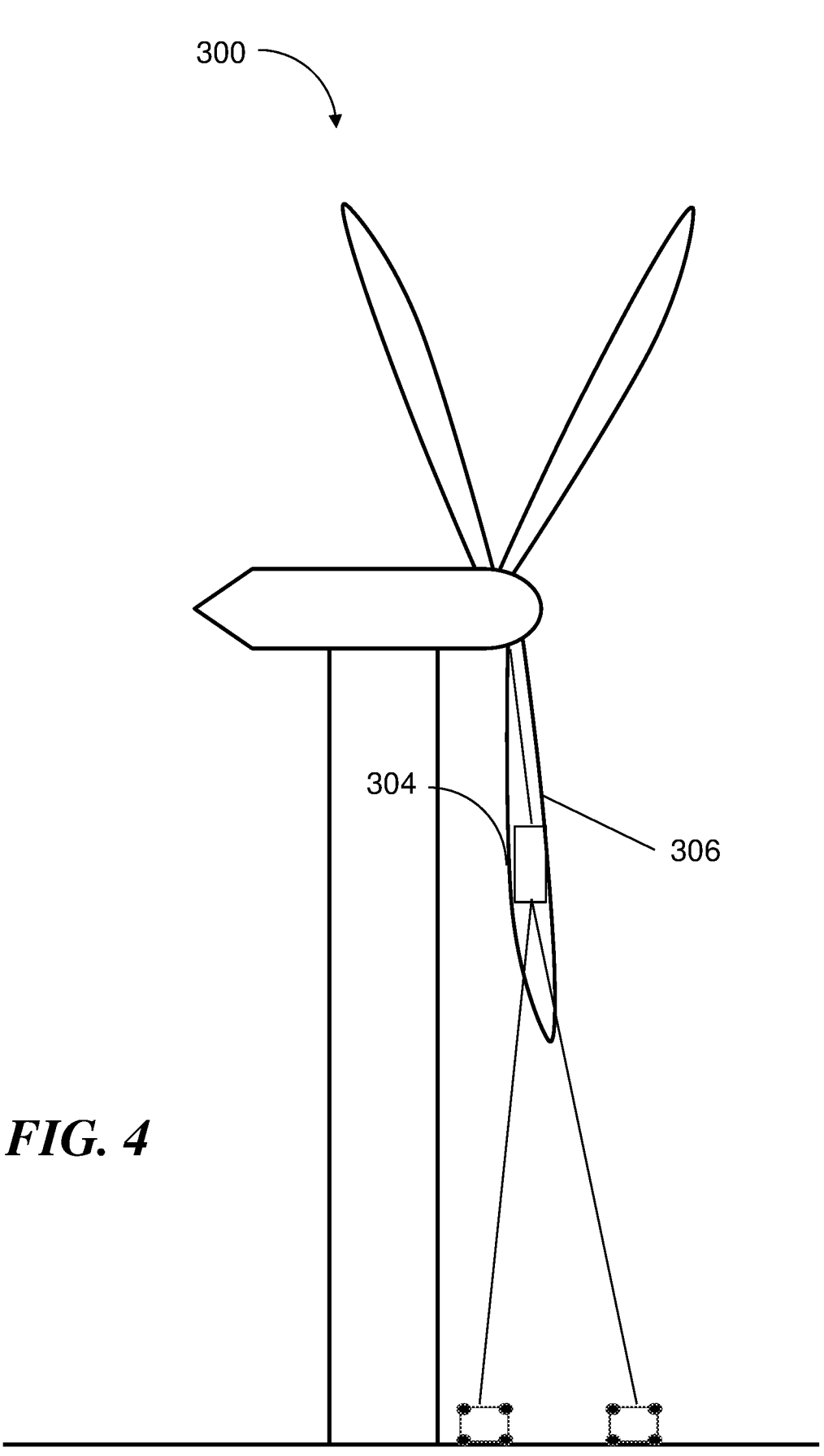

FIGS. 3 and 4 illustrate an example anchoring system 300 employing one or more fasteners 302 (FIG. 3) to connect a computer numerical control (CNC) machine 304 to at least a portion of a wind turbine blade 306. As best shown in FIG. 3, in some aspects, the techniques described herein relate to a method for anchoring the CNC machine 304 to a wind turbine blade 306 including: disposing one or more fasteners 302 of the CNC machine 304 at a surface of the wind turbine blade 306; and implementing one or more tools 308 of the CNC machine 304 at a portion of the wind turbine blade 306. In an embodiment, the one or more fasteners 302 is a removable adhesive 334. The anchoring system 300 may employ a first cable control 310, a second cable control 312, and/or a third cable control 314 mechanically connected to the CNC machine 304 via one or more cables 316. A weight reduction cable 318 may have one end connected to the CNC machine 304 located opposite another end connected to a portion of the wind turbine blade 306. The one or more fasteners 302 of the CNC machine 304 are connected to a portion of the CNC machine 304. The one or more tools 308 of the CNC machine 304 are connected to a portion of an extendable rod 320. The extendable rod 320 may be oriented in an extended and/or retracted configuration. In some embodiments, the one or more tools 308 may slidably traverse 322 a portion of the length of the extendable rod 320 and/or a non-extendable rod and/or hingedly pivot from a fulcrum point 324 of a rod. An actuator may be employed to partially traverse the one or more tools 308 of the CNC machine along a portion of the wind turbine blade.

In some aspects, the techniques described herein relate to a method, further including: The one or more expandable rods may be hingedly pivoted 326 to partially traverse the one or more tools 308 of the CNC machine 304 along a portion of the wind turbine blade 306.

In some aspects, the techniques described herein relate to a method, wherein the one or more fasteners of the CNC machine are removable. For example, the one or more fasteners of the CNC machine comprises a removable suction cup, the removable suction cup implemented under continuous power from a power source of the CNC machine.

In some aspects, the techniques described herein relate to a method, wherein at least a portion of the CNC machine 304 is removably connected to a UAV 328.

In some aspects, the techniques described herein relate to a method, wherein the disposing includes implementing image processing technology 330 to align the CNC machine 304 at a predetermined location at the wind turbine blade.

In some aspects, the techniques described herein relate to a method, further including: analyzing, using one or more sensor 332 of the CNC machine 304, at least a portion of the wind turbine blade. The one or more sensors 332 are capable of transmitting and receiving ultrasonic waves and or x-rays. The one or more sensors 332 include a humidity sensor.

In some aspects, the techniques described herein relate to a CNC machine anchoring system for wind turbine blade maintenance and repair including: one or more fasteners of the CNC machine disposed at a surface of the wind turbine blade; and one or more tools of the CNC machine implemented at a portion of the wind turbine blade.

In some aspects, the techniques described herein relate to a CNC machine anchoring system, wherein the one or more fasteners of the CNC machine are connected to a first end of an extendable rod, the one or more tools of the CNC machine are connected to a second end of the extendable rod.

In some aspects, the techniques described herein relate to a CNC machine anchoring system, further including: an actuator to extend or retract the extendable rod, the extendable rod configured to partially traverse the one or more tools of the CNC machine along a portion of the wind turbine blade.

In some aspects, the techniques described herein relate to a CNC machine anchoring system, wherein the one or more fasteners of the CNC machine are connected to a first end of one or more rods, the one or more tools of the CNC machine are connected to a second end of the one or more rods.

In some aspects, the techniques described herein relate to a CNC machine anchoring system, wherein the one or more rods to partially traverse the one or more tools of the CNC machine along a portion of the wind turbine blade.

In some aspects, the techniques described herein relate to a CNC machine anchoring system, wherein the one or more fasteners of the CNC machine are removable, and at least a portion of the CNC machine is connected to an UAV.

In some aspects, the techniques described herein relate to a CNC machine anchoring system, wherein image processing technology aligns the CNC machine at a predetermined location at the wind turbine blade.

In some aspects, the techniques described herein relate to a CNC machine anchoring system, further including: one or more sensor of the CNC machine to analyze at least a portion of the wind turbine blade.

In some aspects, the techniques described herein relate to a CNC machine anchoring system, wherein the one or more sensors are capable of transmitting and receiving ultrasonic waves and/or an x-ray.

Figure 5:
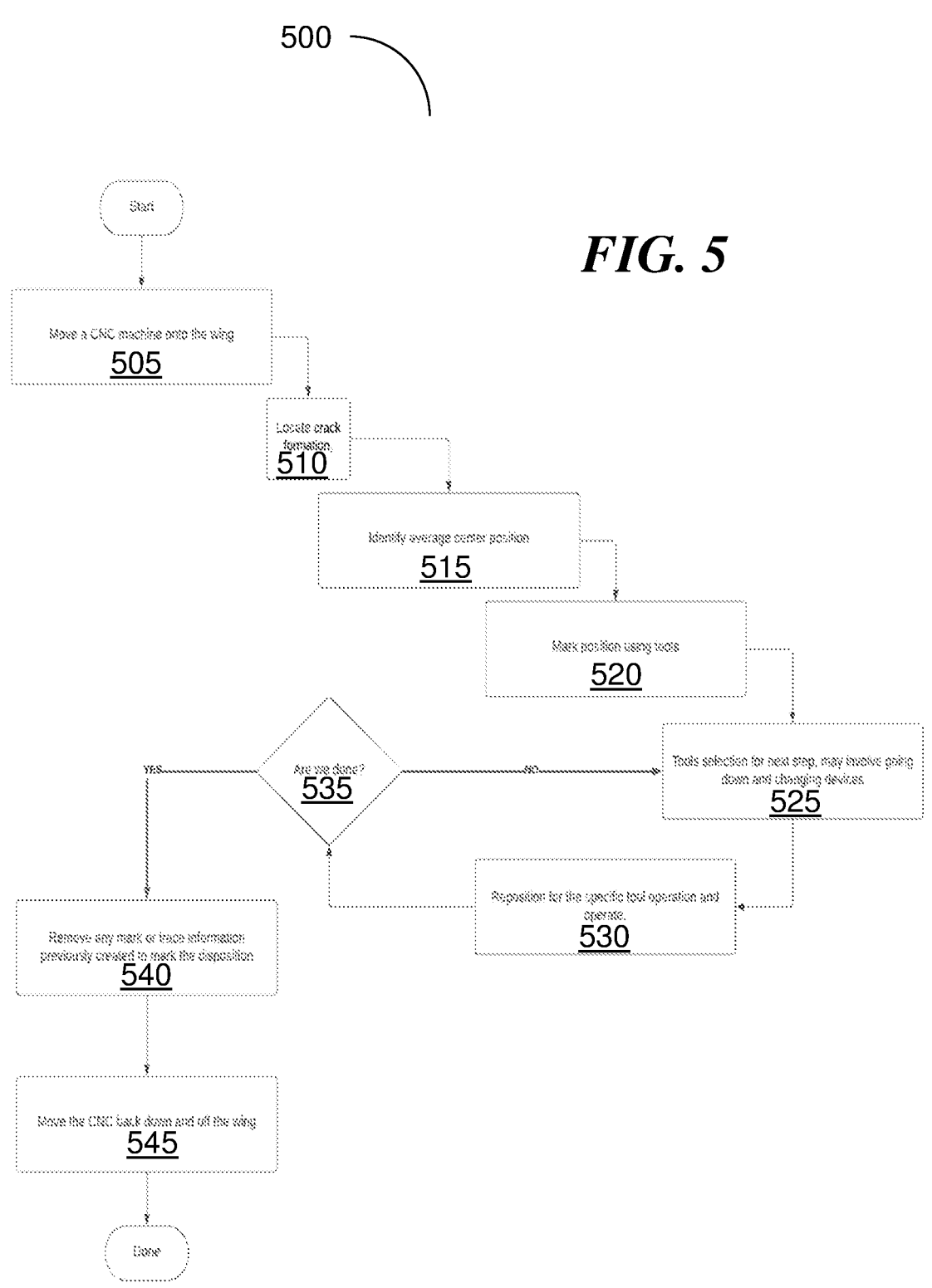
FIG. 5 is a flow chart of an example process using the CNC machine of FIGS. 1-4 to employ one or more fasteners to connect the CNC machine to at least a portion of a wind turbine blade according to some embodiments of the present disclosure.

FIG. 5 illustrates an example process 500 using the CNC machine of FIGS. 1-4 to employ one or more fasteners to connect the CNC machine to at least a portion of a wind turbine blade. At block 505, in the case of damage and/or required maintenance, a CNC machine may be disposed at a portion of the turbine wing. At block 510, the CNC machine may locate a crack formation (note: this may be other repairs required and/or general maintenance tasks and is not limited to a crack formation). At block 515, once located, the system may identify a substantially central portion of the wind turbine blade. At block 520, the system may digitally and/or physically mark the position of the repair with surface indicia, as described more in FIG. 6. At block 525, the system may select the appropriate tool for the next step. This may involve going up and down and changing tools/devices several times. At block 530, once the tool has been selected, the CNC machine may be repositioned for the specific tool operation and the repair/maintenance begins. At block 535, the system determines if the repair and/or maintenance has been completed or is pending. If the repair is not yet complete or a different tool/operation is required, the system moves back to block 525 and a new tool is chosen and sent to the repair site. At block 540, if the repair is complete, the machine may remove any surface indicia and/or trace information. At block 545, the CNC machine may move down, to an outer perimeter edge of the blade, and may be removed from the surface of the blade when the repair is complete.

Figure 6:
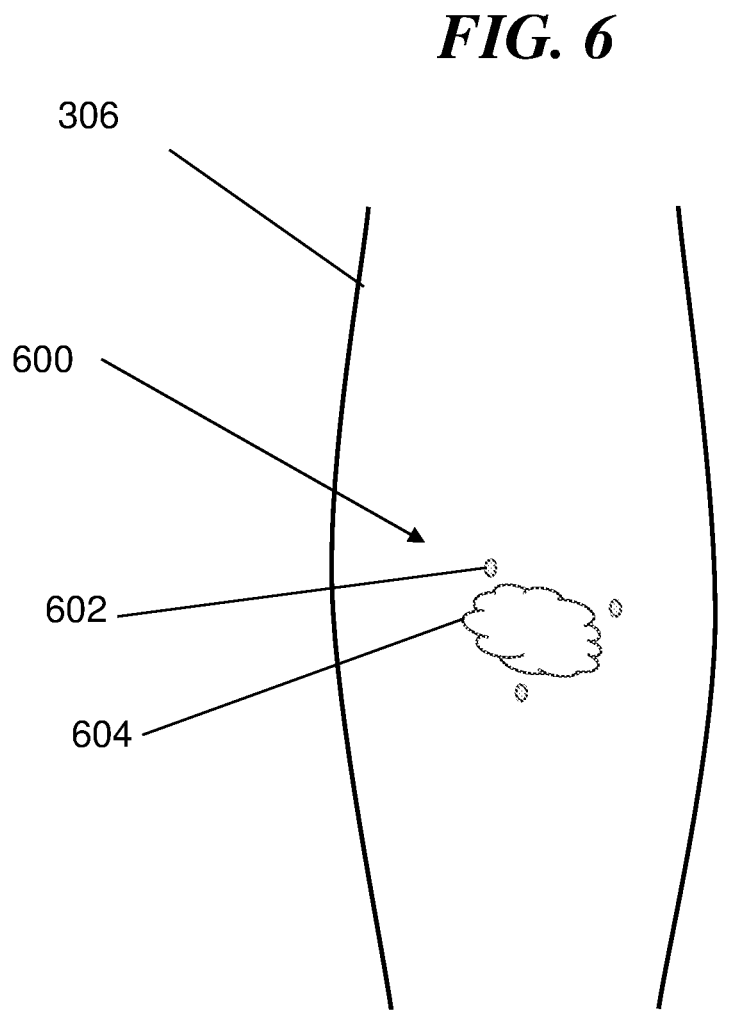

FIG. 6 illustrates an example of a surface indicia 600 implemented in the systems and methods of FIGS. 1-5 such as, one or more digital markings 602, such as at three points, to achieve consistent anchoring location around an impacted area 604 of the wind turbine blade 306 in need of repairs. This will allow for the anchoring system 300 to fix the 3D vertices relative to the impacted area 604. Using surface indicia 600, any UAV 328 and/or CNC machine 304 may consistently position itself accurately relative to the impacted area 604 needing repair based on the surface indicia 600. The CNC machine may be aligned by placing its fasteners precisely at the one or more digital markings 602 on the wind turbine blade 306. This alignment ensures that the machining or other operations performed by the CNC machine 304 are accurately positioned on the surface of the wind turbine blade 306. In an embodiment, surface indicia 600 act as reference points, and by engaging the fasteners with these indicators, the CNC machine 304 may establish a secure and precise connection for carrying out tasks at specific locations on the wind turbine blade 306. This approach contributes to the accuracy and reliability of the CNC machining process in the context of wind turbine maintenance and/or manufacturing.

Figure 7:
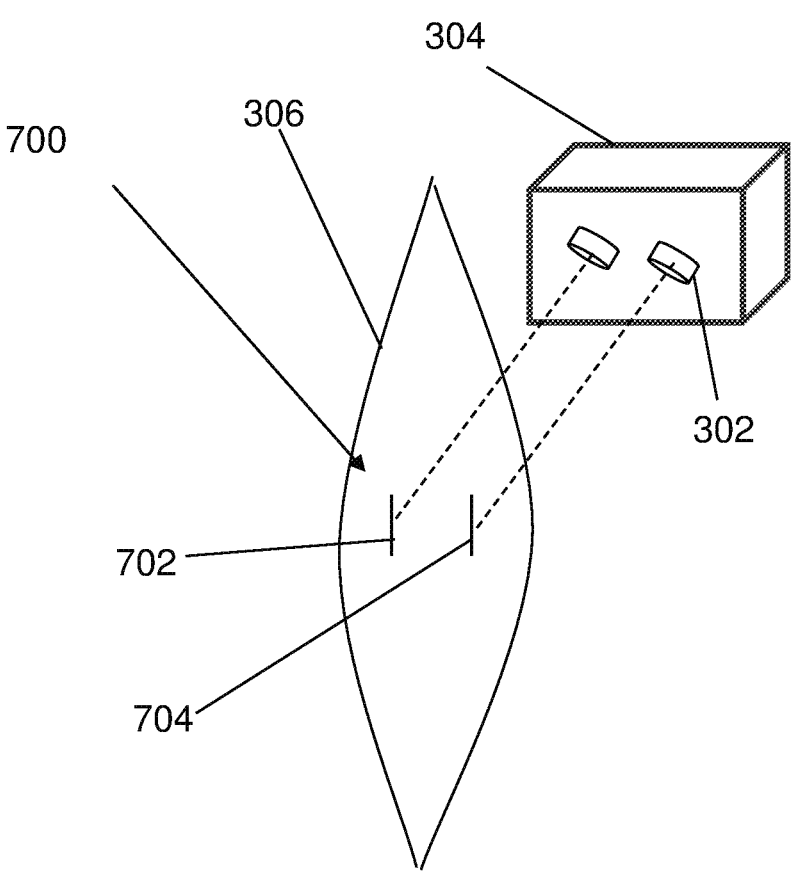
FIG. 7 depicts a perspective view of the one or more fasteners of the CNC machine of FIG. 3 disposed at a surface of the wind turbine blade impacted area requiring repair with the use of a plurality of rods 700.

FIG. 7 depicts an embodiment of the one or more fasteners 302 of the CNC machine 304 of FIG. 3 disposed at a surface of the wind turbine blade 306 impacted area requiring repair with the use of a plurality of rods 700. The impacted area that requires repair with the use of the plurality of rods. First rod 702 and the second rod 704 may be used for anchoring. The plurality of rods may include a low profile metal rods surrounding the impacted area for the CNC machine 304 and/or the drone to use for both anchoring and to move up and down the impacted site for repair and/or maintenance. This allows for movement in a 2D and/or a 3D direction relative to the plurality of rods 700. While the plurality of rods 700 are shown as oriented in a parallel configuration, they do not have to be. The CNC machine 304 may determine rod angles and position the CNC machine 304 in alignment with the plurality of rods 700. The CNC machine 304 may have one or more fasteners 302 configured to removable connect to the first rod 702 and/or the second rod 704 for anchoring the CNC machine 304 to a surface of wind turbine blade 306.

SUMMARY OF IMPLEMENTATIONS

In some aspects, the techniques described herein relate to a method for anchoring the CNC machine to a wind turbine blade including: disposing one or more fasteners of the CNC machine at a surface indicia disposed at a surface of the wind turbine blade; and implementing one or more tools of the CNC machine at a portion of the wind turbine blade.

In some aspects, the techniques described herein relate to a method, wherein the one or more fasteners of the CNC machine are connected to a portion of the CNC machine, the one or more tools of the CNC machine are connected to a portion of an extendable rod.

In some aspects, the techniques described herein relate to a method, further including: extending or retracting the extendable rod, using an actuator configured to partially traverse the one or more tools of the CNC machine along a portion of the wind turbine blade.

In some aspects, the techniques described herein relate to a method, wherein the one or more fasteners of the CNC machine are connected to a first end of one or more rods, the one or more tools of the CNC machine are connected to a second end of the one or more rods.

In some aspects, the techniques described herein relate to a method, further including: hingedly pivoting the one or more rods to partially traverse the one or more tools of the CNC machine along a portion of the wind turbine blade.

In some aspects, the techniques described herein relate to a method, wherein the one or more fasteners of the CNC machine includes a removable suction cup, the removable suction cup implemented under continuous power from a power source of the CNC machine.

In some aspects, the techniques described herein relate to a method, wherein at least a portion of the CNC machine is connected to an unmanned aerial vehicle (UAV).

In some aspects, the techniques described herein relate to a method, wherein the disposing includes implementing image processing technology to align the one or more fasteners of the CNC machine at a surface indicia of a predetermined location at the wind turbine blade.

In some aspects, the techniques described herein relate to a method, further including: analyzing, using one or more sensor of the CNC machine, at least a portion of the wind turbine blade.

In some aspects, the techniques described herein relate to a method, wherein the one or more sensors are capable of transmitting and receiving ultrasonic wave or an x-ray.

In some aspects, the techniques described herein relate to a method, wherein the one or more sensors include a humidity sensor.

In some aspects, the techniques described herein relate to a computer numerical control (CNC) machine anchoring system for wind turbine blade maintenance and repair including: one or more fasteners of the CNC machine disposed at a surface of a wind turbine blade; and one or more tools of the CNC machine implemented at a portion of the wind turbine blade.

In some aspects, the techniques described herein relate to a CNC machine anchoring system, wherein the one or more fasteners of the CNC machine are connected to a first end of an extendable rod, the one or more tools of the CNC machine are connected to a second end of the extendable rod.

In some aspects, the techniques described herein relate to a CNC machine anchoring system, further including: an actuator to extend or retract the extendable rod, the extendable rod configured to partially traverse the one or more tools of the CNC machine along a portion of the wind turbine blade.

In some aspects, the techniques described herein relate to a CNC machine anchoring system, wherein the one or more fasteners of the CNC machine are connected to a first end of one or more rods, the one or more tools of the CNC machine are connected to a second end of the one or more rods.

In some aspects, the techniques described herein relate to a CNC machine anchoring system, wherein the one or more rods to partially traverse the one or more tools of the CNC machine along a portion of the wind turbine blade.

In some aspects, the techniques described herein relate to a CNC machine anchoring system, wherein the one or more fasteners of the CNC machine are removable, and wherein at least a portion of the CNC machine is connected to an unmanned aerial vehicle (UAV).

In some aspects, the techniques described herein relate to a CNC machine anchoring system, wherein image processing technology aligns the CNC machine at a predetermined location at the wind turbine blade.

In some aspects, the techniques described herein relate to a CNC machine anchoring system, further including: one or more sensor of the CNC machine to analyze at least a portion of the wind turbine blade.

In some aspects, the techniques described herein relate to a CNC machine anchoring system, wherein the one or more fasteners is a removable adhesive.

In some embodiments, certain aspects of the techniques described above may be implemented by one or more processors of a processing system executing software. The software comprises one or more sets of executable instructions stored or otherwise tangibly embodied on a non-transitory computer readable storage medium. The software may include the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the such as. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media may include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes may be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for anchoring a computer numerical control (CNC) machine to a wind turbine blade comprising the steps of:
   providing a CNC machine comprising:
      one or more fasteners of the CNC machine configured to be disposed at a surface of a wind turbine blade;
      one or more tools of the CNC machine configured to be implemented at a portion of the wind turbine blade; and
      the one or more fasteners of the CNC machine are connected to a housing of the CNC machine, a first end of an extendable rod is connected to the housing of the CNC machine, the one or more tools of the CNC machine are connected to a second end of the extendable rod;

the one or more tools to slidably traverse at least a portion of a length of the extendable rod;
   locating, using the CNC machine, a repair portion of the wind turbine blade;
   marking, using the CNC machine, an anchoring location around the repair portion of the wind turbine blade with surface indicia;
   selecting, using the CNC machine, the one or more tools;
   disposing the one or more fasteners of the CNC machine at the surface indicia disposed at a surface of the wind turbine blade; and
   implementing the one or more selected tools of the CNC machine at the repair portion of the wind turbine blade.

2. The method of claim 1, further comprising:
   retracting the extendable rod, using an actuator configured to partially traverse the one or more tools of the CNC machine along a portion of the wind turbine blade.

3. The method of claim 1, wherein the one or more fasteners of the CNC machine comprises a removable suction cup, the removable suction cup implemented under continuous power from a power source of the CNC machine.

4. The method of claim 1, wherein at least a portion of the CNC machine is connected to an unmanned aerial vehicle (UAV).

5. The method of claim 1, further comprising:
   analyzing, using one or more sensor of the CNC machine, at least a portion of the wind turbine blade.

6. The method of claim 5, wherein the one or more sensors are capable of transmitting and receiving at least one of an ultrasonic wave or an x-ray.

7. The method of claim 5, wherein the one or more sensors include a humidity sensor.

8. The method of claim 1, wherein the marking is a digital mark.

9. The method of claim 1, wherein the marking is a physical mark.

10. The method of claim 1, wherein the repair portion of the wind turbine blade is a crack formation.

11. The method of claim 1, further comprising extending, using an actuator of the CNC machine, the extendable rod to partially traverse the one or more tools of the CNC machine along a portion of the wind turbine blade.

12. The method of claim 1, further comprising anchoring the CNC machine using an anchoring system comprising:
   connecting a first cable having a first end connected to a first cable control and a second end connected to a housing of the CNC machine;
   connecting a second cable having a first end connected to a second cable control and a second end connected to the housing of the CNC machine; and
   connecting a third cable having a first end connected to a third cable control and a second end connected to the housing of the CNC machine.

13. The method of claim 12, further comprising connecting a weight reduction cable having a first end connected to the housing of the CNC machine and a second end connected to a portion of the wind turbine blade.

14. The method of claim 1, further comprising connecting at least a portion of the CNC machine to an unmanned aerial vehicle and removing the one or more fasteners of the CNC machine from the surface of the wind turbine blade.

15. The method of claim 1, further comprising emitting, using one or more light detection and ranging (LiDAR) sensors of the CNC machine, a laser pulse toward the wind turbine blade to generate a mapping of a surface of the wind turbine blade and aligning the CNC machine at a predetermined location on the wind turbine blade based on the mapping.

16. The method of claim 1, further comprising analyzing, using one or more sensors of the CNC machine, at least a portion of the wind turbine blade.

17. The method of claim 1, wherein disposing the one or more fasteners of the CNC machine at the surface of the wind turbine blade comprises applying a removable adhesive to the surface of the wind turbine blade.

* * * * *